United States Patent [19]

Abbott

[11] Patent Number: 4,799,832
[45] Date of Patent: Jan. 24, 1989

[54] RATCHET TAP WRENCH

[76] Inventor: Neil M. Abbott, 5 Norton Pl., Kirkwood, Mo. 63122

[21] Appl. No.: 2,423

[22] Filed: Jan. 12, 1987

[51] Int. Cl.⁴ .............................................. B23G 5/06
[52] U.S. Cl. ................................ 408/123; 10/141 H; 74/578; 81/63.2; 279/56; 408/120; 408/239 R; 408/240
[58] Field of Search ..................... 74/578; 81/60, 63.1, 81/63.2; 408/120, 123, 217, 218, 238, 239 R, 240, 241 R, 121, 122; 279/56; 10/111, 141 H

[56] References Cited

U.S. PATENT DOCUMENTS

| | | | |
|---|---|---|---|
| 300,771 | 6/1884 | Fray | 81/63.1 X |
| 309,902 | 12/1884 | Watson | 81/63.1 X |
| 835,727 | 11/1906 | Donnelly | 81/63.2 |
| 869,255 | 10/1907 | Myers | 81/63.2 |
| 1,119,292 | 12/1914 | Lawson | 81/63.2 |
| 1,857,012 | 5/1932 | Corley | 279/56 |
| 2,145,762 | 1/1939 | Fox | 408/123 |
| 3,364,510 | 1/1968 | Johnson | 408/123 |
| 4,308,768 | 1/1982 | Wagner | 81/60 |

Primary Examiner—Gil Weidenfeld
Assistant Examiner—Steven C. Bishop
Attorney, Agent, or Firm—Polster Polster and Lucchesi

[57] ABSTRACT

A compact tap wrench includes a ring-base, a pair of diametrically opposed handles, and a chuck mechanism friction-fit into the ring-base. A ratchet mechanism is built into one of the handles. The chuck mechanism includes interchangeable jaws for accommodating different ranges of tap sizes.

17 Claims, 1 Drawing Sheet

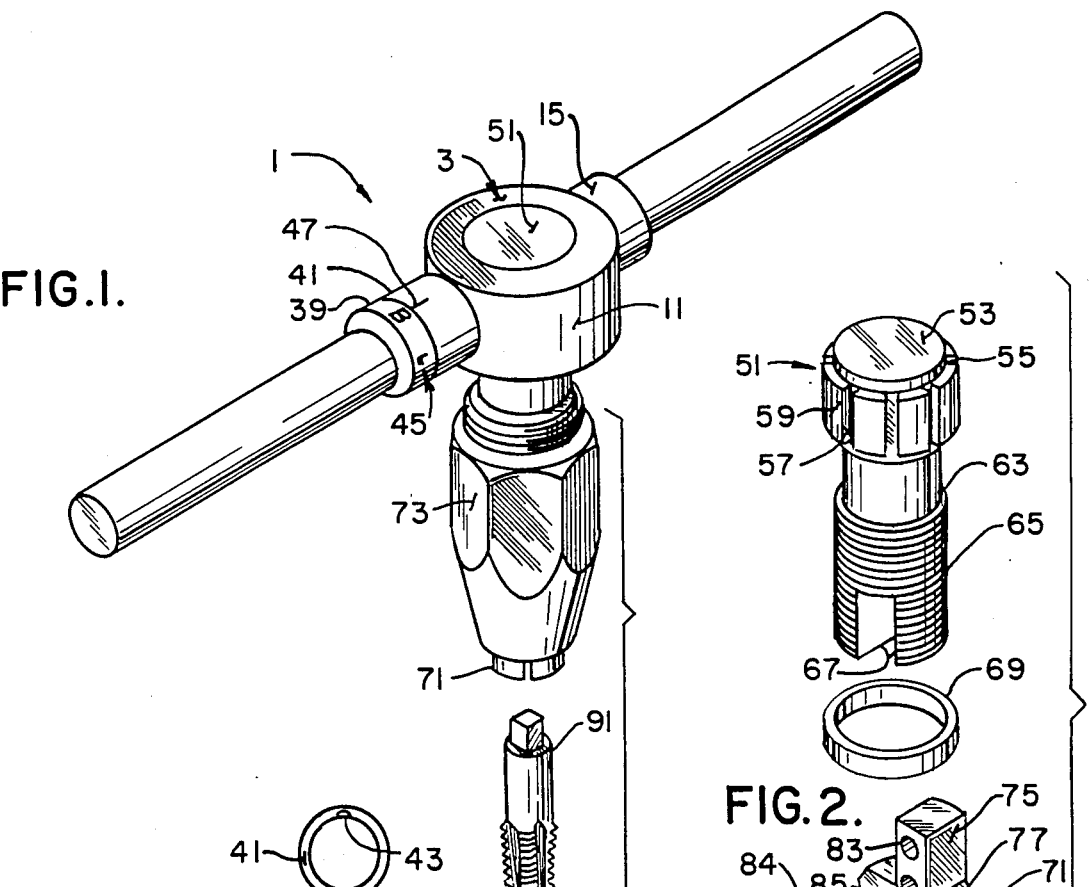
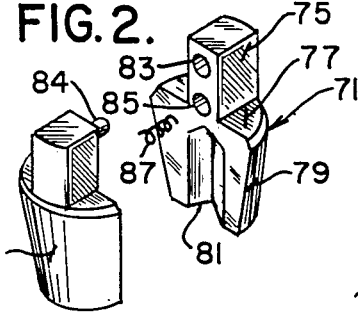
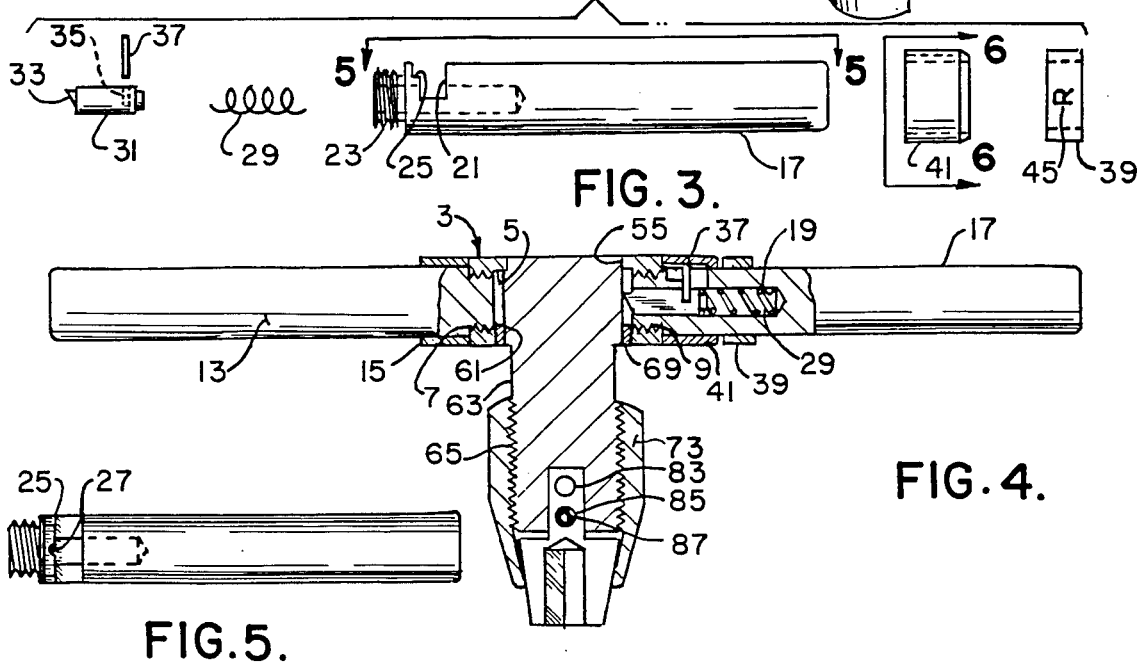

RATCHET TAP WRENCH

BACKGROUND OF THE INVENTION

This invention relates to a tap wrench and in particular to a compact, simple hand-operated tap wrench including a reversible ratchet mechanism.

Ratchet wrenches are well known for a variety of purposes. It has long been recognized as desirable to have a ratchet wrench which is compact and therefore easy to transport and capable of being used in restricted quarters where attachment and movement of the wrench may be quite limited. In such quarters, it may also be desirable to change the direction of ratcheting while the wrench is positioned in the work. At the same time, the wrench must be strong enough to withstand the rather substantial pressures which may be exerted on it. Presently known ratchet wrenches are not always totally adequate in these respects.

One type of ratchet wrench is used for hand-tapping of female threads on the inner surfaces of holes in stock material. In part, these hand taps have the same requirements as other ratchet wrenches. In addition, they must be designed to provide accurate alignment of the wrench and reduce cocking of the tap with respect to the hole. The amount of torque which the user can apply should also be limited when small taps are used and greater when large taps are used. The range of tap sizes which can be accommodated should also be as large as possible. Presently, several different wrenches are required to handle the full range of common taps, from 10/32 (about 0.1875" in diameter) to ⅝ (about 0.625" in diameter). The shank diameter of each tap may vary from manufacturer to manufacturer, and from size to size of the tap. It would be highly desirable to have a universal tap wrench which could be used with taps of a wide range of sizes.

SUMMARY OF THE INVENTION

One of the objects of this invention is to provide a sturdy, highly compact ratchet wrench.

Another object is to provide such a wrench which is easy to use in tight quarters, and whose direction of ratcheting can easily be changed during operation.

Another object is to provide such a wrench which is balanced and simplifies alignment of the wrench with the work.

Another object is to provide a compact ratcheting tap wrench.

Another object is to provide such a compact tap wrench which is simple and sturdy, yet which may easily be modified for use with taps of a wide range of sizes.

Other objects of this invention will be apparent to those skilled in the art in light of the following description and accompanying drawings.

In accordance with one aspect of this invention, generally stated, a compact ratchet wrench is provided comprising a base, a pair of diametrically opposed handles mounted to the base, and a chuck mechanism carried within the base. A ratchet mechanism is built into one of the handles. Preferably, the ratchet mechanism includes an axial bore in one handle, a spring-loaded ratchet clutch pin or pawl in the bore, a locking pin extending through a transverse slot in the handle, and a collar rotatably mounted on the handle for turning the clutch pin through the locking pin. Turning the collar turns a clutch face on the inner ends of the clutch pin, thereby reversing the direction of ratcheting or, in an intermediate position, defeating the ratchet and locking the chuck with respect to the base. The chuck mechanism includes a toothed driven member carried in the base for rotation about a drive axis and a chuck body.

In accordance with another aspect of the invention, the chuck is an expanding chuck which carries a male tap for cutting threads on the inner surface of a hole. The chuck includes a threaded portion integral with the toothed driven member and a collet nut threaded onto the threaded portion. The threaded portion includes a transverse slot. Removable jaws carried in the transverse slot are tightened onto the shank of the tap by tightening the collet nut. Replacing the jaws permits the chuck to be used with a wide variety of taps.

Other aspects of the invention will best be understood in light of the following description of the preferred embodiment.

BRIEF DESCRIPTION OF THE DRAWINGS

In the drawings:

FIG. 1 is a view in perspective of one illustrative embodiment of ratchet tap wrench of the present invention;

FIG. 2 is an exploded view in perspective of a chuck and driven member assembly of the tap wrench of FIG. 1;

FIG. 3 is an exploded view in side elevation of a handle and pawl assembly of the ratchet tap wrench of FIG. 1;

FIG. 4 is a view in side elevation, partially in axial section, of the ratchet tap wrench of FIG. 1;

FIG. 5 is a top plan view of the handle portion of FIG. 3; and

FIG. 6 is a view in end elevation of an adjustment collar of the wrench of FIG. 1.

DESCRIPTION OF THE PREFERRED EMBODIMENT

Referring now to the drawings, and in particular to FIG. 1, reference numeral 1 indicates a ratchet tap wrench in accordance with the present invention. The wrench 1 includes a base part 3 in the form of a ring having an annular lip 5 at its upper edge and a pair of diametrically opposed tapped holes 7 and 9 in its cylindrical wall 11. The base 3 is made of tool steel and has an outside diameter of 1.25 inches, an inside diameter of 0.875 inches and a height of 0.5625 inches. The lip 5 has an inside diameter of 0.75 inches.

The first hole 7 is provided with ⅜×24 threads. Into the hole 7 is threaded a handle 13 having a diameter of 0.4375 inches and a length of 3.0 inches. A decorative collar 15 is press-fitted onto the handle 13 to provide balance as hereinafter described.

The second hole 9 is identical with the first hole 7. Into the second hole 9 is threaded a second handle 17 having a diameter of 0.4375 inches and a length of 3.0 inches. At its inner end, the handle 17 is provided with a one inch deep, 0.1875 inch diameter axial bore 19. A semi-cylindrical groove 21 is cut transversely through the handle 17 at the inner end of the handle 17, spaced a distance of about 0.1 inches from a threaded end portion 23 of the handle 17. The inward end of the groove 21 is provided with a flat 25 carrying a notch 27 which is perpendicular both to the axis of the handle 17 and the bottom of the groove 21. A spring 29 and a pawl 31 are positioned in the axial bore 19. The cylindrical pawl 31 includes a camming surface 33 at its inner end. A transverse bore 35 near the outer end of the pawl 31 frictionally holds a locking pin 37. The spring 29 urges the pawl 31 inwardly, into engagement with the inner face of the slot 21. The stop pin 37 is thus provided with three stable positions: an upright position in the shallow notch 27, and a position to the left or right in which the pin 37 rests on the bottom of the slot 21.

A stop ring 39 is press-fitted onto the handle 17, spaced toward the outer end of handle 17 from the slot 21. A pawl ring 41 is rotatably mounted on the handle 17 between the stop ring 39 and the ratchet wrench base ring 3. The pawl ring 41 includes an axial groove 43 on its inner face for trapping the stop pin 37. Turning the pawl ring 41 therefore rotates the pawl 31 so that the camming surface 33 faces to the left, downward, and to the right as the ring is turned. Preferably, indicia 45 are provided on the stop ring 39 and a line mark 47 is provided on the pawl ring 41 for indicating the position of the pawl's camming surface 33.

As shown particularly in FIG. 2, a driven assembly 51 is rotatably mounted in the base ring 3. The driven assembly 51 includes a body part 53 formed from one inch diameter tool steel rod having a length of 1.875 inches. The upper end of the body 53 is turned to an outer diameter of 0.875 inches, to rotate smoothly in the ring base 3. The upper end of the body member 53 is rabbeted as indicated at 55 to mate with the lip 5 in the ring face 3, thereby forming a thrust bearing for the body member 53. Eight axially extending slots 57 are cut into the upper portion of the body member 53 to form eight teeth 59 on the body member 53. Each tooth is 0.175 inches wide, and each groove is 0.169 inches wide. The teeth have a height of 0.375 inches.

Below the teeth 59, a necked-down portion 61 has a 0.75 inch diameter of the bottoms of the grooves 57, for a distance of 0.125 inches. The next 0.25 inch portion 63 is further necked down to a diameter of 0.625 inches. The lower 0.875 inches of the body part 53 is provided with external 0.75×16 threads 65. At the lower end of the body part 53, is a 0.4375 inch deep by 0.25 inch wide transverse milled slot 67.

The driven body part 53 is held in the ring body 3 by a locking ring 69 having an outer diameter of 0.876 inches, an inner diameter of 0.750 inches and a height of 0.125 inches. The locking ring 69 is press-fitted into the base ring 3 to hold the body member 53 against axial movement. A pair of removable jaws 71 are held in the slot 67 by a threaded collar 73, threaded onto the threaded portion 65 of the body part 53. Each of the jaws 71 includes a neck 75 slidably mounted in the slot 67, a shoulder 77, a tapered camming part 79 and one-half of a square axially extending slot 81. The slot 81 is sized to accommodate a range of about three or four tap shank sizes. Therefore, a set of three pairs of jaws 71 will be sufficient to accommodate tap shank sizes from about 6–32 to about 0.625 inches. Each jaw 71 includes a pivot part 83 for a pivot pin 84 and a pilot hole 85 to hold a coil spring 87 for urging the jaws apart when the collet nut 73 is loosened.

The ratchet tap wrench 1 is assembled as follows. The handle 13 is screwed into the ring body 3. The spring 29 and pawl 31 are inserted into the axial bore 19 of the handle 17, and the pawl pin 37 is pressed into the slot 35. The pawl ring 41 is slipped over the outside end of the handle 17 and positioned with the axial slot 43 over the pin 37. The stop ring 39 is then press-fitted from the outer end of the handle 17 to a position near the outer end of the pawl ring 41, to prevent axial removal of the ring 41. The handle 17 is then screwed into the hole 9 in the ring base 3. If required, shims may be placed between the ring base 3 and the handle 17 to insure that the transverse slot 21 is positioned precisely upward.

The driven member body 53 is inserted into the ring base 3, with the pawl 31 extending into one of the grooves 57. The locking ring 69 is slipped over the driven body member 53 and press-fitted into the base ring 3. The locking ring 69 prevents axial movement of the driven member 53 but permits free rotation. The jaws 71 are then inserted in the transverse slot 67, with the spring 87 between them, and the collet nut 73 is threaded over them.

In use, a set of jaws 71 appropriate for the size tap 91 is inserted in the slot 67 of the driven member 53, and the collet nut 73 is tightened to engage the squared end of the tap 91 in the jaws 71. The pawl ring 41 is turned to the desired position for left or right rotation. For a right-hand thread, the collar 41 will be turned to the right, so that the line mark 47 is aligned with the letter "R" 45 on the locking collar 39. The design of the tap ratchet wrench 1 permits the handles 13 and 17 to be grasped with either one hand or two hands, although one hand normally will be used. The balance provided by equally weighted handles permits easy positioning of the wrench perpendicular to the workpiece as the hole in the workpiece is tapped. The compact size of the wrench permits it to be used in close quarters, and its height permits it to extend into small openings. The tapping process can be carried out by oscillation of the tap wrench, rather than requiring complete rotation. Backing the tap out of the hole is accomplished by reversing the position of the collar 41. This operation can easily be carried out with one hand without removing the user's grip on the wrench. Using the wrench therefore is far easier than using prior wrenches, and the risk of tilting the wrench with respect to the work, thereby damaging the work or the tap, is greatly reduced.

When space permits rotation of the wrench, the adjustment collar 41 is set in the central, "B" position. The arms 13 and 17 permit the wrench to be held in two hands if necessary, and arm extenders may be placed on the arms to give greater leverage when needed.

The wrench is extremely compact, sturdy, versatile, and easy to use.

Numerous variations in the ratchet tap wrench of the present invention, within the scope of the appended claims, will occur to those skilled in the art in light of the foregoing disclosure.

I claim:

1. A compact, balanced, hand-held ratchet wrench capable of being held and operated with a single hand, the wrench comprising a ring base, a pair of diametrically opposed handles mounted to the base, a rotatable driven member carried within the base, and a ratchet mechanism means built into one of the handles for forming a ratcheting connection with the rotatable driven member selectively in either of two directions, the wrench being sized and shaped to permit both handles to be grasped and the ring base turned with a single hand and the ratchet mechanism means being sized and shaped to be operated with the hand holding the wrench without removing the hand's grip on the wrench, the ratchet mechanism means including an axial bore in one handle, a spring-loaded pawl in the bore, the pawl having a clutch face engaging the driven member, a locking pin extending through a transverse slot in the handle, and a collar rotatably mounted on the handle for turning the pawl through the locking pin, the collar rotating the pawl to positions for reversing the direction of ratcheting and for locking the chuck with respect to the base.

2. The wrench of claim 1 wherein the driven member includes a toothed portion carried in the base for rotation about a drive axis, and a chuck body portion.

3. The wrench of claim 2 further comprising movable jaws carried by the chuck body and a collet nut threaded onto the chuck body for tightening and loosening the movable jaws.

4. The wrench of claim 3 wherein the chuck body includes a transverse slot, and wherein the jaws comprise a pair of removable jaws carried in the transverse slot.

5. The wrench of claim 4 wherein the wrench is a hand tap wrench and wherein the jaws comprise a four-sided opening for engaging a square shank of a male tap.

6. The tap wrench of claim 5 further comprising means for biasing the jaws to an expanded position for permitting easy insertion of a tap into the jaws when the collet nut is loosened.

7. The wrench of claim 1 wherein the collar is continuous on its outer surface and includes a groove on its inner surface for trapping the locking pin.

8. The wrench of claim 7 further including a stop ring on the handle for trapping the collar between the stop ring and the ring base.

9. The wrench of claim 1 further including a stop ring on the handle for trapping the collar between the stop ring and the ring base.

10. A compact hand tap wrench for manually cutting threads on the inner surface of a hole, the wrench comprising
   a ring base,
   at least one handle on the base for manually turning the base,
   a driven member carried by the base for rotation with respect to the base, and
   a ratchet mechanism for converting oscillating movement of the base to rotational movement of the driven member,
   the driven member comprising
       a generally cylindrical body having an axis of rotation,
       a toothed portion at an upper end of the cylindrical body, the toothed portion forming a part of the ratchet mechanism, and
       a chuck at a lower end of the cylindrical body, the chuck including an externally threaded portion on the lower end of the cylindrical body, a collet nut threaded onto the threaded portion, and jaw means for tightening onto the shank of a male tap by tightening the collet nut on the threaded portion of the cylindrical body.

11. The tap wrench of claim 10 wherein the chuck includes a transverse slot in the lower end of the cylindrical body, and wherein the jaw means comprise at least two pairs of removable jaws sized and proportioned to be carried in the transverse slot, each pair of jaws being sized to accommodate a different size shank of a male tap.

12. A compact hand tap wrench for manually cutting threads on the inner surface of a hole, the wrench comprising a ring base, a pair of diametrically opposed handles mounted to the base, a rotatable driven member carried within the base, and a ratchet mechanism for converting oscillating movement of the base to rotational movement of the driven member, the driven member comprising a generally cylindrical body having an axis of rotation, a toothed portion at an upper end of the cylindrical body, the toothed portion forming a part of the ratchet mechanism, and a chuck at a lower end of the driven member, the chuck including a threaded portion on the lower end of the cylindrical body, a collet nut threaded onto the threaded portion, and jaw means for tightening onto the shank of a male tap by tightening the collet nut on the threaded portion of the cylindrical body, the wrench being sized and shaped to permit both handles to be grasped and the ring base and driven member turned with a single hand.

13. The tap wrench of claim 12 wherein the jaw means form an expandable four-sided opening for engaging a square shank of a male tap, the tap wrench further comprising a second set of jaws of a different size from said first-mentioned jaws, the second set of jaws being interchangeable with said first-mentioned jaws and being sized to accommodate a different size shank of a male tap.

14. A compact ratchet wrench comprising a ring base, a pair of diametrically opposed handles mounted to the base, a rotatable driven member carried within the base, a ratchet mechanism built into one of the handles, and a chuck body, the ratchet mechanism including an axial bore in one handle, a spring-loaded pawl in the bore, the pawl having a clutch face engaging the driven member, a locking pin extending through a transverse slot in the handle, and a collar rotatably mounted on the handle for turning the pawl through the locking pin, the collar moving the pawl to positions for reversing the direction of ratcheting and for locking the chuck with respect to the base; the driven member including a toothed driven member carried in the base for rotation about a drive axis; movable jaws carried by the chuck body and a collet nut threaded onto the chuck body for tightening and loosening the movable jaws, the chuck body including a transverse slot, and the jaws comprising a pair of removable jaws carried in the transverse slot.

15. The wrench of claim 14 wherein the wrench is a hand tap wrench and wherein the jaws comprise a four-sided opening for engaging a square shank of a male tap.

16. A compact ratchet wrench comprising a ring base, a pair of diametrically opposed handles mounted to the base, a rotatable driven member carried within the base, the driven member including a toothed driven member carried in the base for rotation about a drive axis, and a ratchet mechanism built into one of the handles, the ratchet mechanism including an axial bore in one handle and a spring-loaded pawl in the bore, the pawl having a clutch face engaging the driven member, and means for rotating the pawl from a first position in which the pawl drives the driven member in only a first direction, to a second position in which the pawl drives the driven member in two directions, to a third position in which the pawl drives the driven member in only a second direction, the means for rotating the pawl comprising a locking pin extending through a transverse slot in the handle, and a collar rotatably mounted on the handle for turning the pawl through the locking pin, the collar being continuous on its outer surface and including a groove on its inner surface for trapping the locking pin.

17. The wrench of claim 16 wherein the wrench is sized and shaped to permit both handles to be grasped and the ring base and driven member turned with a single hand and to permit the means for rotating the pawl to be rotated to any of its three positions without removing the single hand's grip on the wrench.

* * * * *